United States Patent
Sakai

(10) Patent No.: US 9,509,239 B2
(45) Date of Patent: Nov. 29, 2016

(54) ROTATING ELECTRIC MACHINE CONTROL SYSTEM

(71) Applicant: DENSO CORPORATION, Kariya, Aichi-pref. (JP)

(72) Inventor: Naoto Sakai, Kariya (JP)

(73) Assignee: DENSO CORPORATION, Kariya (JP)

(*) Notice: Subject to any disclaimer, the term of this patent is extended or adjusted under 35 U.S.C. 154(b) by 32 days.

(21) Appl. No.: 14/708,351

(22) Filed: May 11, 2015

(65) Prior Publication Data

US 2015/0333672 A1    Nov. 19, 2015

(30) Foreign Application Priority Data

May 14, 2014 (JP) .................................. 2014-100670

(51) Int. Cl.
| | | |
|---|---|---|
| *H02P 6/14* | (2016.01) | |
| *B60L 11/00* | (2006.01) | |
| *H02P 6/16* | (2016.01) | |
| *H02P 21/06* | (2016.01) | |

(52) U.S. Cl.
CPC ................. *H02P 6/16* (2013.01); *B60L 11/00* (2013.01); *H02P 21/06* (2013.01)

(58) Field of Classification Search
CPC  B60L 2210/40; B60L 11/14; B60L 2240/80; B60L 3/0061; B60L 3/0084; B60L 11/126; B60L 11/1803; B60L 11/1861; B60L 11/1864; B60L 11/1887; B60L 2210/10; B60L 2240/36; B60L 2240/421
USPC ............ 318/400.02, 400.04, 400.13, 400.21, 318/473; 701/22
See application file for complete search history.

(56) References Cited

U.S. PATENT DOCUMENTS

| | | | | |
|---|---|---|---|---|
| 4,449,087 A | * | 5/1984 | Lippitt | H02P 25/024 318/721 |
| 5,398,238 A | * | 3/1995 | Inagawa | G06F 13/4027 340/4.2 |
| 2005/0263121 A1 | * | 12/2005 | Tamagawa | F02N 11/08 123/179.3 |
| 2012/0062158 A1 | * | 3/2012 | Itou | H02P 23/0077 318/400.21 |
| 2012/0065823 A1 | * | 3/2012 | Taguchi | B60L 3/0061 701/22 |

(Continued)

FOREIGN PATENT DOCUMENTS

| | | |
|---|---|---|
| JP | 3422916 B2 | 7/2003 |
| JP | 2010-011546 A | 1/2010 |

(Continued)

OTHER PUBLICATIONS

U.S. Appl. No. 14/708,352, filed May 11, 2015, Denso Corporation.

*Primary Examiner* — Paul Ip
(74) *Attorney, Agent, or Firm* — Posz Law Group, PLC

(57) ABSTRACT

A rotating electric machine control system has a power control unit (PCU) and a control section separately disposed therein. The apparatus receives a trigger signal from a communicator of the PCU via a trigger communication line from an MG ECU when the MG ECU obtains electric angles from a rotation sensor. The communicator, upon receiving an input of the trigger signal, generates a communication frame that includes plural detection values from a current sensor and a voltage sensor. Then, the communicator outputs the communication frame to the MG ECU via a multiplex communication line. The MG ECU performs a preset process for a control of an inverter and a booster converter based on the detected electric angles and the communication frame matching with those electric angles.

4 Claims, 8 Drawing Sheets

(56) References Cited

U.S. PATENT DOCUMENTS

| | | | | |
|---|---|---|---|---|
| 2012/0139460 A1* | 6/2012 | Senkou | ............... | H02P 21/0096 318/400.02 |
| 2012/0326650 A1* | 12/2012 | Ito | ........................ | H02P 29/0044 318/473 |
| 2012/0330485 A1* | 12/2012 | Tamagawa | ............... | B60K 6/46 701/22 |
| 2013/0038342 A1* | 2/2013 | Nozaki | .................. | B60L 3/0038 324/750.3 |

FOREIGN PATENT DOCUMENTS

| | | |
|---|---|---|
| JP | 2012-016110 A | 1/2012 |
| JP | 2013-001185 A | 1/2013 |
| JP | 2013-258843 A | 12/2013 |

\* cited by examiner

ROTATING ELECTRIC MACHINE CONTROL SYSTEM

CROSS REFERENCE TO RELATED APPLICATION

The present application is based on and claims the benefit of priority of Japanese Patent Application No. 2014-100670, filed on May 14, 2014, the disclosure of which is incorporated herein by reference.

TECHNICAL FIELD

The present disclosure generally relates to a rotating electric machine control system for controlling rotating electric machines in a vehicle, having at least one rotating electric machine that is used as a power source for a travel of the vehicle.

BACKGROUND INFORMATION

Conventionally, within the art of rotating electric machines, a rotating electric machine control system controls at least one rotating electric machines within a vehicle to provide power for a travel of the vehicle.

For example, a patent document 1 (i.e., Japanese patent JP-A-2013-1185) discloses a rotating electric machine control system having a voltage converter for converting a direct current voltage of a direct current power source and outputting a converted three-phase alternating current to the rotating electric machine and a control section for controlling the voltage converter to have an output of a requested torque from the rotating electric machine.

The rotating electric machine control system described above further includes a current detector that detects an electric current output from the voltage converter to the rotating electric machine in each of three phases, a voltage detector that detects the direct current voltage supplied from the direct current power source, and a rotation detector that detects a rotation position of the rotating electric machine. The control section controls the voltage converter based on detection signals from each of those detectors.

However, in view of installability of the rotating electric machine control system within a vehicle, when considering a functionality distribution consideration and a manufacturing cost, the voltage converter and the control section in the rotating electric machine control system may be provided as two separate components, rather than one. More practically and precisely, a power control unit having the voltage converter and a control section may be separated from each other. Further, the rotation detector may also be separately provided apart from the power control unit, to be close to the rotating electric machine.

On the other hand, the current detector detects the electric current that is output from the voltage converter to the rotating electric machine in each of the three phases. When the voltage converter includes a booster converter, the current detector also detects the electric current flowing in a reactor. Therefore, the current detector is arranged to be proximate to the voltage converter.

Further, the voltage detector detects the direct current voltage supplied from the direct current power source. When the booster converter is included in the voltage converter, the voltage detector also detects the direct current voltage after the boosting. Therefore, the voltage detector is also arranged to be proximate to the voltage converter.

Thus, the current detector and the voltage detector constitute the power control unit together with the voltage converter. Therefore, the number of communication lines (i.e., wire harness) connecting the power control unit and the control section increases dramatically. The increase of the number of communication lines means an increase of the manufacturing cost. Further, when the control section is disposed in a vehicle compartment and the power control unit is disposed in an engine room, the communication lines connecting the two have to pass through a dividing wall between the vehicle compartment and the engine room, i.e., pass through a small hole, which has, usually, a very small dimension, for the quietness of the compartment and the rigidity of the vehicle body. That is, the number of communication lines must be limited under a certain number for the above-described restrictions.

For the resolution of the above problem, a communication frame including two or more detection values from at least one of the current detector or the voltage detector may be generated, and such communication frames may be transmitted via the multiplex communication line, for reducing the number of communication lines. This multiplex communication line is used for communications according to a CAN-FD (Controller Area Network Flexible Data Rate) protocol or similar communications (CAN is a registered trademark). In such case, the power control unit further includes a communication device, which receives plural values detected by at least one of the current detector or the voltage detector, and generates and outputs a communication frame which includes plural values from the detectors.

However, the delay of communication caused by a signal transmission via the multiplex communication line will make it difficult to time-synchronize the detection values from the current/voltage detectors with the detection value from the rotation detector. In other words, the controllability of the voltage converter may be deteriorated.

SUMMARY

It is an object of the present disclosure to provide a rotating electric machine control system, in which a power control unit (PCU) that includes and separately provides a voltage converter and a control section for reducing the number of communication lines between the PCU and the control section without deteriorating the controllability of the voltage converter.

The following description provides a technical solution for achieving the above-described goal. The parenthesized numbers in the following description and in the claims merely indicate relationships of the described components to concrete objects in the embodiments, thereby not limiting the disclosure in any sense. Further, the embodiments may be arbitrarily combined as a whole or in part, unless otherwise indicated.

In an aspect of the present disclosure, the rotating electric machine control system is disposed in a vehicle and controls rotating electric machines, at least one rotating electric machine used to power a travel of a vehicle. The rotating electric machine control system includes a power control unit including a voltage converter that converts a direct current voltage from a direct current power source and outputting a converted three-phase alternating current to the at least one rotating electric machine, a current detector that detects an electric current, as a detected current value, that is output from the voltage converter to the at least one rotating electric machine in each of three phases, a voltage detector that detects the direct current voltage, as a detected voltage value, and a communicator that receives plural values detected by at least one of the current detector or the voltage detector, generating a communication frame that includes the plural values, and outputting the communication frame that includes the plural values. The rotating electric machine control system also includes a control section that controls the voltage converter to output the converted three-phase alternating current to the at least one rotating electric machine which outputs a requested torque from the at least one rotating electric machine, the control section being provided separately apart from the power control unit, a multiplex communication line that communicably connects the power control unit and the control section for a transmission of the communication frame from the communicator to the control section, a rotation detector that detects a rotation position of the at least one rotating electric machine and outputting the rotation position to the control section via a line other than the multiplex communication line, and a trigger communication line that communicably connects the power control unit and the control section to transmit a trigger signal from the control section to the communicator. The control section outputs the trigger signal via the trigger communication line to the communicator upon receiving the rotation position from the rotation detector. The communicator, upon receiving an input of the trigger signal, generates the communication frame by receiving at least one of a plurality of detected current values or a plurality of detected voltage values from at least one of the current detector or the voltage detector, and outputs the communication frame to the control section via the multiplex communication line. The control section performs a preset process for a control of the voltage converter based on (i) the rotation position from the rotation detector and (ii) the communication frame at a corresponding timing that corresponds to the rotation position from the rotation detector.

According to the above, the communicator in the power control unit generates a communication frame that includes plural values that are detected by at least one of the current detector or the voltage detector. Further, the generated communication frame is transmitted to the control section via the multiplex communication line. Therefore, the number of communication lines between the power control unit and the control section is reduced.

Further, the control section outputs the trigger signal to the communicator upon receiving the value from the rotation detector. Then, upon having an input of the trigger signal, the communicator generates and outputs a communication frame to the control section via the multiplex communication line. Therefore, a time synchronization between (i) the plural values in the communication frame, i.e., values from at least one of the current detector and voltage detector and (ii) a value from the rotation detector is established. Thereby, a fall/deterioration of the controllability of the voltage converter is prevented.

Further, in another aspect of the present disclosure, the rotating electric machine control system that controls rotating electric machines, at least one rotating electric machines used to power a travel of a vehicle. The rotating electric machine control system includes a power control unit with a voltage converter that converts a direct current voltage from a direct current power source and outputting a converted three-phase alternating current to the at least one rotating electric machine, a current detector that detects an electric current, as a detected current value, that is output from the voltage converter to the at least one rotating electric machine in each of three phases, a voltage detector that detects the direct current voltage, as a detected voltage value, and a communicator that receives plural values detected by at least one of the current detector or the voltage detector, generating a communication frame that includes the plural values, and outputting the communication frame that includes the plural values. The rotating electric machine control system also includes a control section that controls the voltage converter to output the converted three-phase alternating current to the at least one rotating electric machine which outputs a requested torque from the at least one rotating electric machine, the control section being provided separately apart from the power control unit, a multiplex communication line that communicably connects the power control unit and the control section for a transmission of the communication frame from the communicator to the control section, a rotation detector that detects a rotation position of the at least one rotating electric machine and outputting the rotation position to the control section via a line other than the multiplex communication line, and a trigger communication line that communicably connects the power control unit and the control section to transmit a trigger signal from the control section to the communicator. The communicator, upon receiving at least one of a plurality of detected current values or a plurality of detected voltage values from at least one of the current detector or the voltage detector, outputs the trigger signal to the control section via the trigger communication line, generates the communication frame, and outputs the communication frame to the control section via the multiplex communication line. The control section, upon receiving an input of the trigger signal, receives the rotation position from the rotation detector and performs a preset process for a control of the voltage converter based on the rotation position and the communication at a corresponding timing that corresponds to the rotation position.

According to the above, the number of communication lines between the power control unit and the control section is reduced just like the above-described disclosure.

Further, the communicator outputs the trigger signal to the control section upon receiving the plural detection values (i.e., detected current values or detected voltage values) from at least one of the current detector or the voltage detector, and the control section, upon having an input of the trigger signal, receives the detection value from the rotation detector. Therefore, a time synchronization between (i) the plural values in the communication frame, i.e., values from at least one of the current detector and voltage detector and (ii) a value from the rotation detector is established. Thereby, a fall/deterioration of the controllability of the voltage converter is prevented.

BRIEF DESCRIPTION OF THE FIGURES

Objects, features, and advantages of the present disclosure will become more apparent from the following detailed description made with reference to the accompanying drawings, in which.

DETAILED DESCRIPTION

Hereafter, the embodiment of the present disclosure is described with reference to the drawings. The like numbers show like parts in each of the embodiments described below.

First Embodiment

In the present embodiment, an application of an MG controller to a split-type hybrid vehicle is described.

Figure 1:
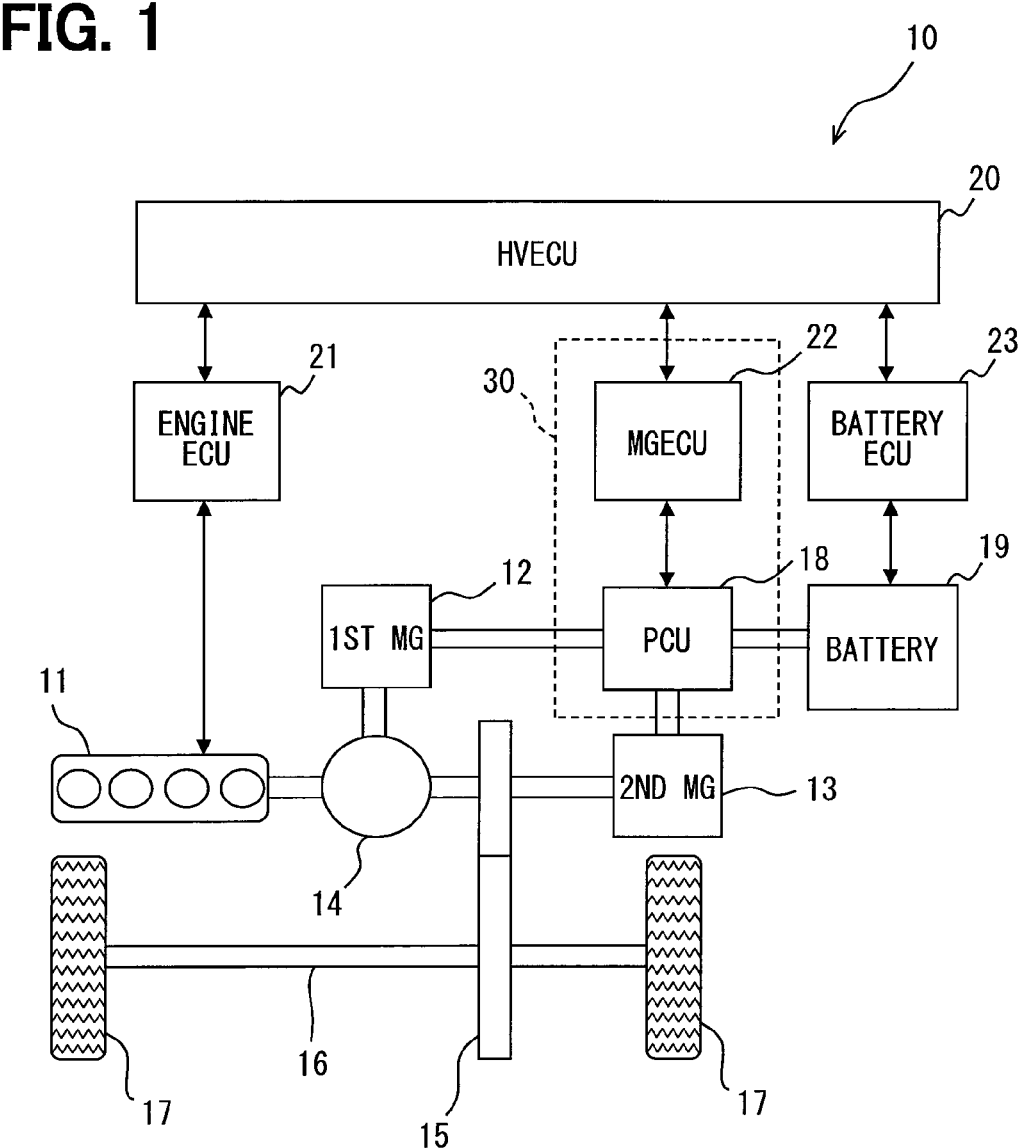
FIG. 1 is a block diagram of a hybrid vehicle of the present disclosure.

First, an outline configuration of a hybrid vehicle is described based on FIG. 1.

As shown in FIG. 1, a hybrid vehicle 10 is provided with an engine 11 which is an internal-combustion engine, a first motor-generator 12, and a second motor-generator 13. The motor-generator may also be designated as the MG, which means that the MG 12 or the first MG 12 represents the first motor-generator 12. Further, the MG 13 or the second MG 13 represents the second motor-generator 13. These MGs 12 and 13 are equivalent to a rotating electric machine in the claims.

The MGs 12 and 13 are respectively constituted as a synchronous generator-motor, which has the rotator having a permanent magnet attached thereon, and the stator having three phase windings wound thereon. The first MG 12 generates electricity by receiving a driving force from outside thereof, and serves as a starter for starting the engine 11. The engine 11, the first MG 12 and second MG 13 are mutually connected via a power splitter 14.

The power splitter 14 serves as a gearbox for distributing a driving force of the engine 11 among the first MG 12 and a speed reduction gear 15, as well as serving as a transmission.

The hybrid vehicle 10 travels on the driving force at least from one of the engine 11 and second MG 13, depending on a situation.

The speed reduction gear 15 transmits the power generated by the engine 11, the first MG 12 and the second MG 13 to a drive wheel 17 via a drive shaft 16, or transmits the driving force from the drive wheel 17 (back) to the engine 11, the first MG 12 and the second MG 13.

The hybrid vehicle 10 is further provided with a power control unit 18 (i.e., a PCU 18) and a battery 19. The battery 19 is a chargeable and dischargeable direct current power source, for example, and consists of rechargeable batteries, e.g. nickel hydride batteries and/or lithium ion batteries. Hereafter, the power control unit 18 may be designated as the PCU 18.

The PCU 18 is connected to the first MG12, the second MG 13, and the battery 19. The PCU 18 includes an inverter and a booster converter. The inverter performs a current control, converting a direct current of the battery 19 to/from an alternating current of each of the MGs 12 and 13.

On the other hand, the booster converter boosts the voltage of the battery 19 to a high voltage for supplying the boosted voltage to the inverter, and downs the high voltage of the inverter for the charging of the battery 19.

Therefore, the electric power generated by the first MG 12 is supplied to the second MG 13 via the inverter of the PCU 18, and the same electric power can also be charged to the battery 19 via the inverter and the booster converter of the PCU 18.

Further, the electric power generated by the MGs 12 and 13 can also be charged to the battery 19 via the PCU 18.

Still further, the electric power charged in the battery 19 can also be supplied to the second MG 13 via the PCU 18.

In addition, the hybrid vehicle 10 is provided with an HVECU 20, an engine ECU 21 and an MGECU 22, and a battery ECU 23. The MGECU 22 is equivalent to a control section in the claims.

Each of the ECUs 20-23 are constituted, for example, to include a so-called microcomputer that consists of CPU, ROM, RAM, a register, I/O, etc., for example. The CPU performs signal processing according to a signal and a program, i.e., the signal obtained via I/O and the program stored in the ROM with the help of RAM, the registers and the like. Further, the processed signal from the signal processing is output via I/O. Thereby, each of the ECUs 20-23 can perform various functions. In each of the ECUs 20-23, an IC may be provided in addition to the microcomputer.

The HVECU 20 manages the engine ECU 21, the MGECU 22, and the battery ECU 23 in a cooperative manner, and controls an entire drive system of the hybrid vehicle 10 for an optimal and efficient operation of the hybrid vehicle 10. The HVECU 20 calculates a driving force of the vehicle 10 based on a driver's operation of the vehicle 10 (e.g., an accelerator opening), a travel speed, etc., and determines a distribution of a requested power among the engine 11 and the MGs 12 and 13 according to the travel state of the hybrid vehicle 10.

The engine ECU 21 controls an operation state of the engine 11. More practically, for drawing/generating a requested power from the engine 11, the ECU 21 controls a throttle valve, which is not illustrated, to have a suitable opening, and also controls a fuel injection amount and an ignition timing of the engine 11. The engine ECU 21 controls the drive of the engine 11 according to a control signal from the HVECU 20. Further, as required, data about the driving state of the engine 11 is output from the engine ECU 21 to the HVECU 20.

The MGECU 22 controls the MGs 12 and 13 according to the state of the hybrid vehicle 10. More practically, by outputting a control signal to the PCU 18, the MGECU 22 controls the MGs 12 and 13. The MGECU 22 controls the drive of the MGs 12 and 13 according to the control signal from the HVECU 20. Further, as required, data about the driving state of the MGs 12 and 13 is output to the HVECU 20.

The battery ECU 23 controls a charge-and-discharge state of the battery 19 while monitoring a charge state of the battery 19. The battery ECU 23 receives an input of a signal for a management of the battery 19, e.g., a signal representing an inter-terminal voltage of the battery 19, charge and discharge electric currents, battery temperature, and the like. The battery ECU 23 outputs data about the state of the battery 19 to the HVECU 20 as required.

Figure 2:
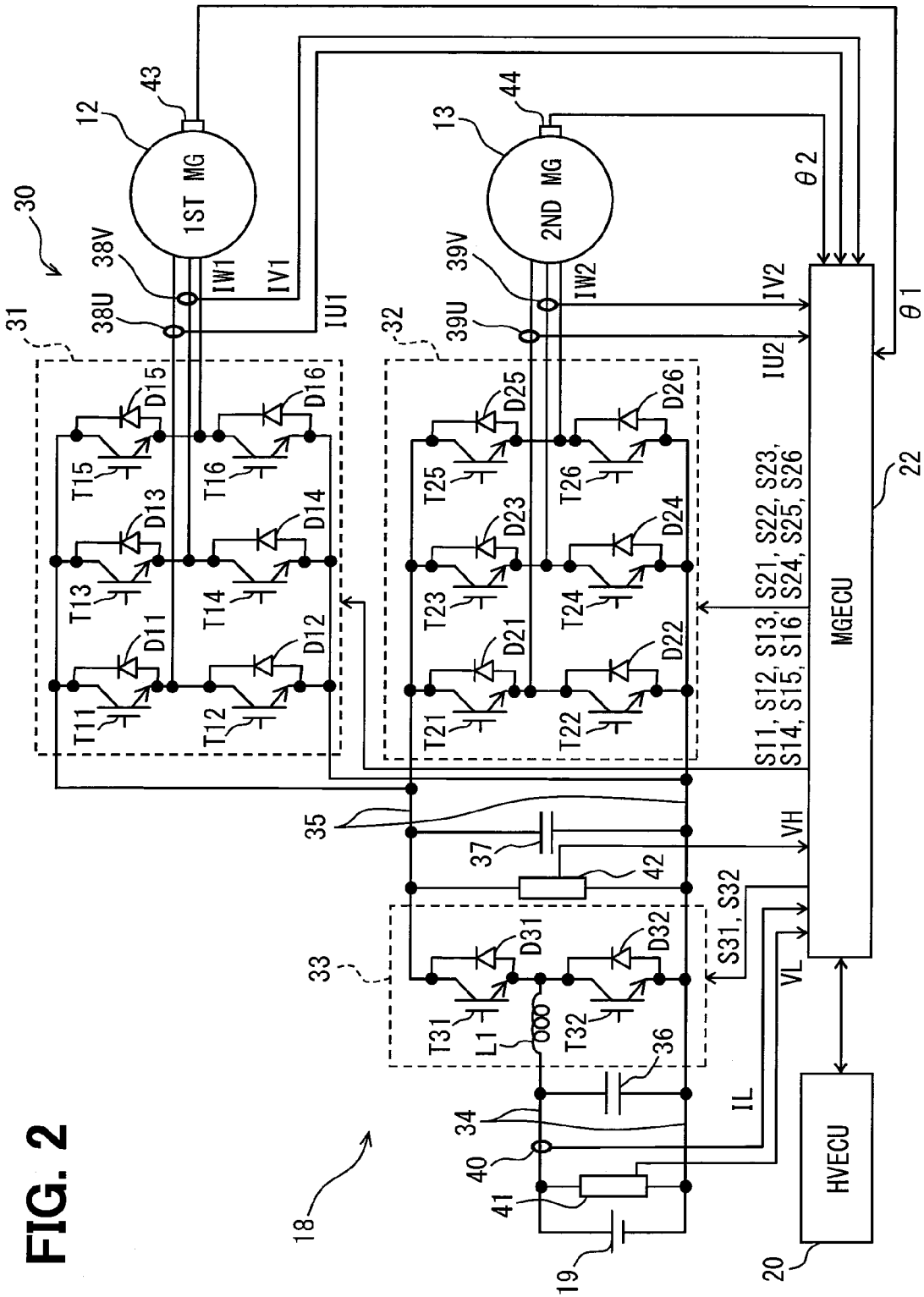
FIG. 2 is a schematic diagram of an MG controller used in the hybrid vehicle of FIG. 1.
Figure 3:
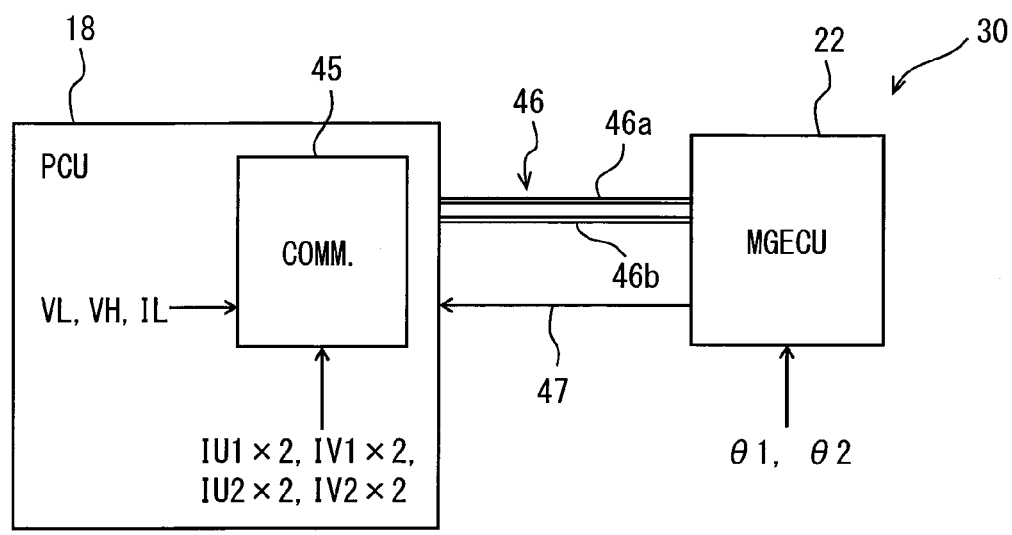
FIG. 3 is a block diagram of the MG controller of the present disclosure.

Next, based on FIGS. 2 and 3, an MG controller 30 applied to the above-mentioned hybrid vehicle 10 is described. The MG controller 30 is equivalent to a rotating electric machine control system in the claims.

As shown in FIG. 2, the MG controller 30 is provided with the PCU 18 and the MGECU 22. The PCU 18 has two inverters 31 and 32 which drive the MGs 12 and 13, and a booster converter 33. The booster converter 33 converts a voltage between a low-voltage power line 34 connected to the battery 19 and a high-voltage power line 35 connected to the inverters 31 and 32. The inverters 31 and 32 and the booster converter 33 are equivalent to a voltage converter in the claims.

The inverter 31 has transistors T11-T16 and diodes D11-D16, among which the transistors T11-T16 are in series connection between the plus and the minus sides of the high-voltage power line 35, two transistors in respective series, and the diodes D11-D16 are in reverse-parallel connection with each of those transistors T11-T16, for forming an "upper arm" and a "lower arm" for each of three phases.

Further, to a connection point of a U phase arm between transistors T11 and T12, a U phase coil of the first MG 12 is connected. Similarly, to a connection point of a V phase arm between transistors T13 and T14, a V phase coil of the first MG 12 is connected, and to a connection point of a W phase arm between transistors T15 and T16, a W phase coil of the first MG 12 is connected.

The inverter 32 has transistors T21-T26 and diodes D21-D26, among which the transistors T21-T26 are in series connection between the plus and the minus sides of the high-voltage power line 35, two transistors in respective series, and the diodes D21-D26 are in reverse-parallel connection with each of those transistors T21-T26, for forming an "upper arm" and a "lower arm" for each of three phases.

Further, to a connection point of a U phase arm between transistors T21 and T22, a U phase coil of the second MG 13 is connected. Similarly, to a connection point of a V phase arm between transistors T23 and T24, a V phase coil of the second MG 13 is connected, and to a connection point of a W phase arm between transistors T25 and T26, a W phase coil of the second MG 13 is connected.

As the transistors T11-T16 and T21-T26, "power transistors" such as IGBT, MOSFET, etc. may be employable.

The booster converter 33 includes a transistor T31 connected to a plus side of the high voltage power line 35 and a transistor T32 connected to a minus side of the high voltage power line 35, together with diodes D31, D32, respectively connected reverse-parallel to the transistors T31, T32.

In addition, the booster converter 33 has a reactor L1 connected to plus terminal side of the low-voltage power line 34 while being connected to a junction point between the transistor T31 and the transistor T32.

As the transistor T31 and T32, "power transistors" such as IGBT, MOSFET, etc. may be employable.

In addition, the PCU 18 includes smoothing capacitors 36 and 37, current sensors 38U, 38V, 39U, 39V, and 40, and voltage sensors 41 and 42.

These current sensors 38U, 38V, 39U, 39V, and 40 are equivalent to a current detector in the claims, and the voltage sensors 41 and 42 are equivalent to a voltage detector in the claims.

The smoothing capacitor 36 is disposed at a position between the plus side and the minus side of the low-voltage power line 34, and is connected in parallel with the battery 19.

The smoothing capacitor 37 is disposed at a position between the plus side and the minus side of the high-voltage power line 35, and is connected in parallel with the inverters 31 and 32.

The current sensor 38U detects an electric current IU1 which flows into the U phase coil among the three phases of the first MG 12 (i.e., detects an actual current value), and the current sensor 38V detects an electric current IV1 which flows into the V phase coil.

Similarly, the current sensor 39U detects an electric current IU2 which flows into the U phase coil among the three phases of the second MG 13 (i.e., detects an actual current value), and the current sensor 39V detects an electric current IV2 which flows into the V phase coil.

The current sensor 40 detects an electric current IL which flows into the reactor L1, i.e., detects the charge and discharge currents.

The voltage sensor 41 is attached at a position between the terminals of the battery 19, and detects a battery voltage, i.e., a before-boost voltage VL. On the other hand, the voltage sensor 42 is attached at a position between the terminals of the smoothing capacitor 37, and detects a direct current voltage of the high-voltage power line 35, i.e., an after-boost voltage VH.

In addition, the MG controller 30 is provided with rotation angle sensors 43 and 44 independently/separately from the PCU 18 and the MGECU 22. The rotation angle sensors 43 and 44 are used to detect an absolute value of a rotation position (i.e., a magnetic pole position) of each of the MGs 12 and 13.

The rotation angle sensor 43 detects a rotation position (i.e., an electric angle $\theta 1$) of the first MG 12 by a specific unit angle, and the rotation angle sensor 44 detects a rotation position (i.e., an electric angle $\theta 2$) of the second MG 13 at a specific unit angle. The rotation angle sensors 43 and 44 are equivalent to a rotation detector in the claims.

The MGECU 22 receives an input of the electric currents IU1, IV1, IU2, IV2, and IL, which are detected by the current sensors 38U, 38V, 39U, 39V, and 40, and also receives an input of the voltages VL and VH detected by the voltage sensors 41 and 42. Further, the MGECU 22 receives an input of the electric angles $\theta 1$ and $\theta 2$ detected by the rotation angle sensors 43 and 44.

On the other hand, the MGECU 22 outputs control signals S31 and S32 for controlling the booster converter 33, while outputting control signals S11-S16, S21-S26 for controlling the inverters 31 and 32.

For example, the transistor T11 is controlled by the control signal S11, and the transistor T21 is controlled by the control signal S21.

In the present embodiment, the MGECU 22 computes the electric current IW1 which flows into the W phase coil of the first MG 12 from the electric currents IU1 and IV1 detected by the current sensors 38U and 38V, based on a fact that the sum of the instantaneous values of the electric currents which flow into the three phase coils equals to zero. Further, based on the electric currents IU2 and IV2 detected by the current sensors 39U and 39V, the electric current IW2 which flows into the W phase coil of the second MG 13 is computed. The electric currents IW1 and IW2 may also be detected by having the other sensors for directly those currents IW1 and IW2, i.e., by providing a current sensor on each of the three phases.

The MGECU 22 calculates a rate of charge (SOC) of the battery 19, i.e., a rate of the stored electricity against the full charge capacity of the battery 19, based on an integration value of the electric current IL. Further, based on the calculated SOC and the battery temperature detected by a temperature sensor, which is not illustrated, limit I/O values Win and Wout, which are the maximum permissible power for the charge and discharge of the battery 19, are calculated.

The MGECU 22 sets a torque instruction for each of the MGs 12 and 13, i.e., for an output of the requested torque therefrom, to be within the limit I/O values Win and Wout of the battery 19. Then, based on each of the set-up torque instructions and the values detected by each of the sensors 38U, 38V, 39U, 39V, 40, 43, and 44, the control signals S11-S16, S21-S26 for the switching control of the inverters 31 and 32 are generated and output. In the present embodiment, the torque instruction is provided from the HVECU 20.

A situation is described for the first MG 12, for example. The MGECU 22 performs a three-phase to two-phase conversion for converting the three-phase current IU1, IV1, and IW1 to get a d-axis current and a q-axis current based on the electric current IU1, IV1, IW1 of each of three phases and the electric angle θ1. Further, based on the torque instruction, a d-axis electric current instruction and a q-axis electric current instruction are set. Then, based on a difference between the converted d-axis electric current and the setting of the d-axis electric current instruction and a difference between the converted q-axis electric current and the setting of the q-axis electric current instruction, a feedback control (e.g., a PI control) is performed for setting a d-axis voltage instruction and a q-axis voltage instruction, respectively. Then, the settings of the d-axis voltage instruction and the q-axis voltage instruction are converted to get a phase voltage instruction for each of the three phases, by the two-phase to three-phase conversion. Then, for an application of the voltage to each of the three phases of the first MG 12 according to each of the phase voltage instructions, the control signals S11-S16 for the switching control of the transistors T11-T16 are generated, and the generated signals are output to the inverter 31. The same scheme applies to the second MG 13.

Further, the MGECU 22 outputs the control signals S31 and S32 for the switching control of the booster converter 33, so that the after-boost voltage VH may approach a target voltage.

Specifically, based on each of the number of rotations of the MGs 12 and 13, which are computed from each of the torque instructions and each of the electric angles θ1 and θ2, the target voltages which should be applied to the inverters 31 and 32 are set. Then, a duty is set up by a feedback control so that the difference between the voltage VH and the target voltage is reduced.

Subsequently, the control signals S31 and S32 for the switching control of the transistor T31 and T32 of the booster converter 33 with an ON time rate according to the set-up duty are generated, and the generated signals S31, S32 are output to the booster converter 33.

In addition to above-mentioned inverters 31 and 32, the booster converter 33, and each of the sensors 38U, 38V, 39U, 39V, 40-42, etc., the PCU 18 has a communicator 45, as shown in FIG. 3. Further, the MG controller 30 is provided with a multiplex communication line 46 and a trigger communication line 47 respectively as a communication line which connects the PCU 18 and the MGECU 22. The communicator 45 is equivalent to a communicator in the claims.

The communicator 45 generates the communication frame containing the plurality of the values detected by the current sensors 38U, 38V, 39U, 39V, and 40 and the voltage sensors 41 and 42. The generated communication frame is output from the communicator 45 to the MGECU 22 via the multiplex communication line 46. The communicator 45 providing an above-described function may be implemented as a microcomputer, or may be implemented as ICs, for example ASIC.

The types of the communication frame generated by the communicator 45 are not specifically limited to a certain type. That is, only one type frame may be generated, or plural type frames may be generated by the communicator 45. The communication frame is set up to be transmitted (from the communicator 45) to the MGECU 22 during a period from (i) an input of the trigger signal (described later) to the communicator 45 to (ii) a calculation for a control of the inverters 31 and 32 and the booster converter 33 by the MGECU 22. For the above set up, a control cycle (i.e., an calculation cycle) of the MGECU 22, the number of the multiplex communication lines 46, the number of data pieces contained in one communication frame, and a transmission speed of the communication frame, etc. are taken into consideration.

In the present embodiment, the electric currents IU1, IV1, IU2, and IV2 detected by the current sensors 38U, 38V, 39U, and 39V are input to the communicator 45 via two channels, respectively, e.g. from IU11 main sensor and a IU1 subsensor collectively illustrated as current sensor 38U in FIG. 2. Further, while the electric current IL is inputted from the current sensor 40, the voltages VL and VH are inputted from the voltage sensors 41 and 42, respectively. Then, after receiving the above data, in eleven pieces, the communicator 45 generates two communication frames. For example, in one of the two communication frames, two channel's electric currents IU1, IV1, IU2, and IV2, i.e., 8 data pieces in total are contained. In the other communication frame, two channel's electric currents IU2 and IV2 and the electric current IL and the voltages VL and VH are contained, that is, 7 data pieces in total.

Among the communication lines connecting the PCU 18 and the MGECU 22, the multiplex communication line 46 and the trigger communication line 47 are separately disposed from the other lines which transmit the control signals S11-S16, S21-S26, S31, and S32. The multiplex communication line 46 and the trigger communication line 47 respectively connect the PCU 18 and the MGECU 22 in a 1 to 1 manner.

The multiplex communication line 46 connects the PCU 18 and the MGECU 22 so that the communication frame generated by the communicator 45 is transmitted to the MGECU 22. Since the communication frame contains plural data pieces as described above, plural data pieces are transmitted via the multiplex communication line 46, i.e., in a sharing manner sharing one communication line.

According to the present embodiment, the multiplex communication line 46 is used for communication according to a CAN-FD (Controller Area Network Flexible Data Rate) protocol. Further, as the multiplex communication line 46, two lines are actually provided. That is, a first multiplex communication line 46a that transmits one of the above-mentioned two communication frames and a second multiplex communication line 46b that transmits the other frame are provided. Since these multiplex communication lines 46a and 46b are CAN bus lines, two communication paths are included in each of two lines 46a and 46b.

The communication line may be used for other communications, i.e., other protocols, such as FlexRay, Ethernet, besides the CAN-FD. CAN, FlexRay, and Ethernet are registered trademarks, respectively.

The trigger communication line 47 connects the PCU 18 and the MGECU 22 so that a trigger signal mentioned later is transmitted from the MGECU 22 to the communicator 45 of the PCU 18. The trigger communication line 47 is an exclusive line for exclusively transmitting the trigger signal.

Figure 4:
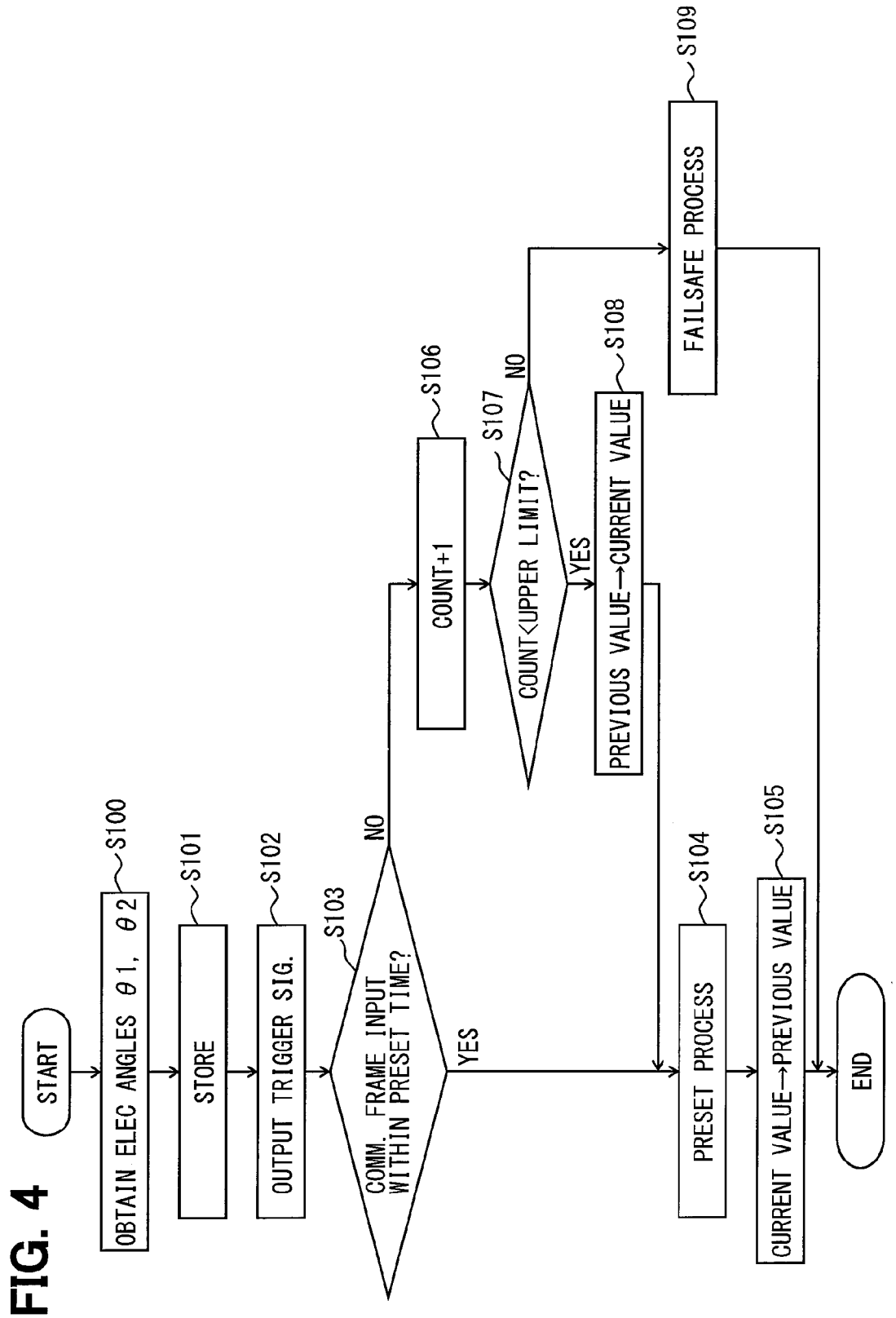
FIG. 4 is a flowchart of a process performed by an MGECU of the present disclosure.
Figure 5:
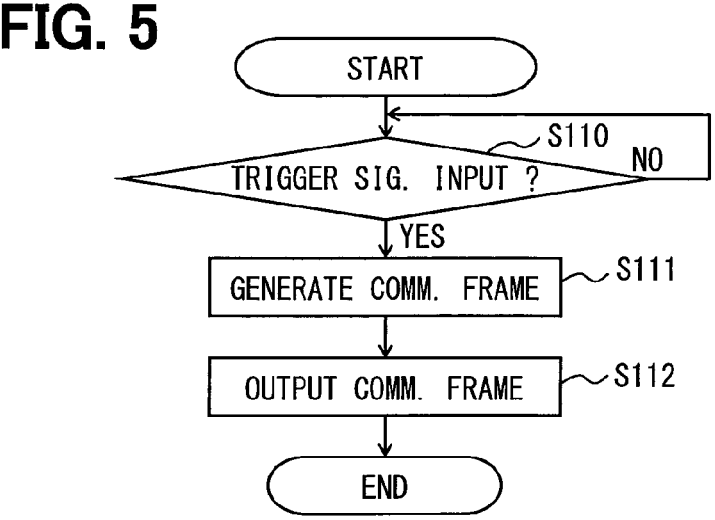
FIG. 5 is a flowchart of a process performed by a PCU of the present disclosure.

Next, based on flowcharts shown in FIGS. 4 and 5, a control method of the MG controller 30 for controlling the inverters 31 and 32 and the booster converter 33 is described.

FIG. 4 illustrates a process on the MGECU 22. When a power supply of the MGECU 22 is switched ON, the MGECU 22 performs the following process. Further, while the power supply is switched ON, the process is repeatedly performed.

The microcomputer of the MGECU 22 obtains the electric angles $\theta1$ and $\theta2$ detected by the rotation angle sensors 43 and 44 (Step S100). The communication line used for the above is different from the multiplex communication line 46 and the trigger communication line 47 described above, and the electric angles $\theta1$ and $\theta2$ are directly input to the MGECU 22 from the rotation angle sensors 43 and 44. Then, the MGECU 22 stores the obtained data in an internal memory of the microcomputer, for example (Step S101).

According to the present embodiment, the microcomputer of the MGECU 22 performs a calculation for the control of the inverters 31, 32 and the booster converter 33 at a cycle of 100 μs, for example. Therefore, the microcomputer obtains the electric angles $\theta1$ and $\theta2$ before the above calculation, e.g., 80 μs prior to the calculation. In addition, the microcomputer obtains the electric angles $\theta1$ and $\theta2$ at the same cycle as the calculation cycle of the MGECU 22. The calculation cycle of the microcomputer of the MGECU 22 is not limited to the above-mentioned example, i.e., may also be set to 50 μs, for example. The timing for obtaining the electric angles $\theta1$ and $\theta2$ may be any timing, as long as the obtainment timing is prior to the calculation timing of the microcomputer of the MGECU 22 and as long as the obtainment timing precedes the calculation timing by a time amount that is shorter than the calculation cycle of the microcomputer.

The microcomputer of the MGECU 22 outputs the trigger signal to the communicator 45 of the PCU 18 via the trigger communication line 47 upon receiving/obtaining the electric angles $\theta1$ and $\theta2$ from the rotation angle sensors 43 and 44 (Step S102).

The microcomputer of the MGECU 22 generates the trigger signal so that, for example, the trigger signal indicates an obtain operation for obtaining a detection signal (i.e., an analog signal) from the rotation angle sensors 43 and 44 based on the comparison of the detection signal and a threshold value of a comparator. More practically, a high-level signal is generated as the trigger signal, and a rise of the analog signal from LO to HI and a fall of the analog signal from HI to LO are defined as trigger timings. Then, the generated trigger signal is output to the communicator 45 via the trigger communication line 47. Further, the trigger signal may also be generated according to a sampling of N/D conversion, for example.

After the output of the trigger signal, the microcomputer of the MGECU 22 determines whether an input of a communication frame is received within a preset time (Step S103).

According to the present embodiment, it is determined whether an input of the two communication frames is observed within 80 μs from the output of the trigger signal, i.e., by/before a timing at which the MGECU 22 performs the calculation for the control of the inverters 31 and 32 and the booster converter 33 after the output of the trigger signal.

In Step S103, if it is determined that an input of the communication frame is observed, the microcomputer of the MGECU 22 performs a preset process for controlling the inverters 31 and 32 and the booster converter 33 (Step S104). In such preset process, by using the electric angles $\theta1$ and $\theta2$ stored in S101 and the electric currents IU1, IV1, IU2, and IV2 in the inputted communication frames from two channels, as well as using the electric current IL and the voltages VL and VH, the calculation is performed.

Subsequently, the microcomputer of the MGECU 22 stores current values of the above, i.e., the electric currents IU1, IV1, IU2, IV2, IL and the voltages VL and VH, plus the electric angles $\theta1$, $\theta2$ used in the preset process in the current step S104, to the memory as previous values (Step S105). Then, a series of processes are finished.

In Step S103, on the other hand, if it is determined that no input of the communication frame is observed, i.e., at least one of two communication frames is not received, the microcomputer of the MGECU 22 counts up an internal counter by 1 (Step S106), and determines whether the count reaches an upper limit of preset value (Step S107).

In Step S107, if it is determined that the count is less than the upper limit, the microcomputer of the MGECU 22 reads the previous value in the memory, and sets them as the current values (Step S108). Then, steps after S104 are performed.

In the present embodiment, every time the power supply for the MGECU 22 is switched ON, the previous value is set to a certain preset value.

In Step S107, if it is determined that the count is equal to or greater than the upper limit, the microcomputer of the MGECU 22 performs a failsafe process (Step S109). Then, a series of processes are finished.

As the failsafe process, the MGECU 22 may prohibit the control of the MGs 12 and 13, for example. Alternatively, in the failsafe process, the MGECU 22 may output a failsafe signal to the HVECU 20, and, in response, the HVECU 20 may switch a travel mode of the vehicle to an engine-only mode, i.e., drawing the travel power only from the engine 11.

FIG. 5 shows a process in the PCU 18. The communicator 45 of the PCU 18 performs the following process, when a power supply thereto is switched ON. Further, while the power supply is switched ON, the process is repeatedly performed.

The communicator 45 determines first whether the trigger signal is inputted from the MGECU 22 (Step S110). In Step S110, if it is determined that the trigger signal is input, the communicator 45 immediately obtains the values detected by the current sensors 38U, 38V, 39U, 39V, and 40 and the voltage sensors 41 and 42, and generates the above-mentioned two communication frames (Step S111). Therefore, the obtainment timing for obtaining the electric currents IU1, IV1, IU2, and IV2 from two channels and the electric current IL and the voltages VL and VH is substantially the same as the obtainment timing of the electric angles $\theta1$ and $\theta2$ by the MGECU 22.

Then, the communicator 45 outputs each of the generated communication frames to the MGECU 22 via corresponding multiplex communication line 46 (46a, 46b) (Step S112). The two communication frames are output to the MGECU 22 almost simultaneously. Then, after completion of the output of the communication frames, a series of processes are finished.

Figure 6:
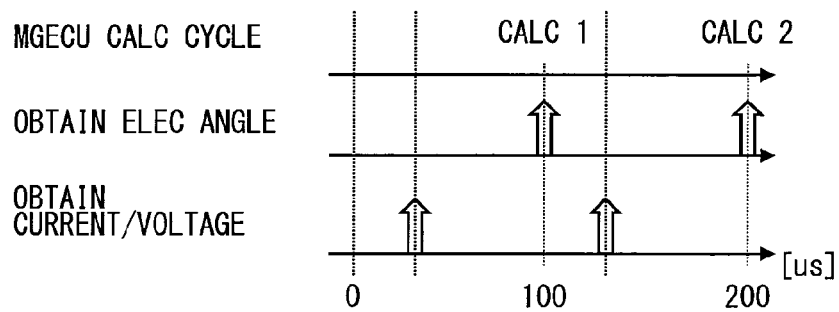
FIG. 6 is a time chart of an operational effect of the MG controller of a reference example.
Figure 7:
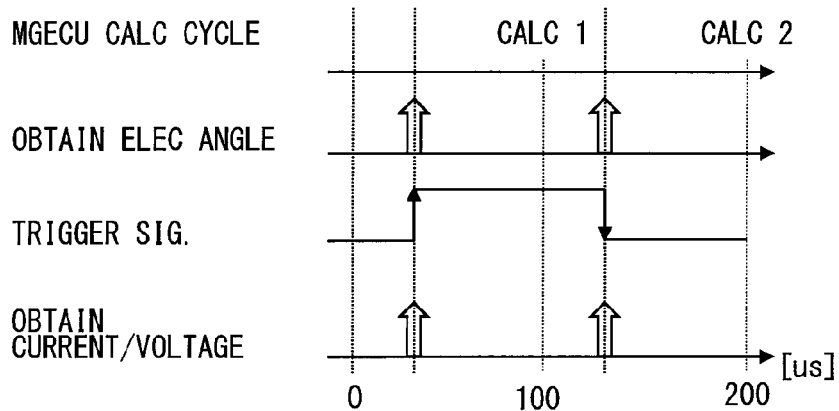
FIG. 7 is a time chart of an operational effect of the MG controller of the present disclosure.

Next, the operation effects of the MG controller 30 are described based on FIGS. 6 and 7.

According to the present embodiment, the PCU 18 has the communicator 45, and the communicator 45 generates the communication frame containing the plurality of the values detected by the current sensors 38U, 38V, 39U, 39V, 40 and the voltage sensors 41 and 42. The generated communication frame is transmitted to the MGECU 22 via the multiplex communication line 46.

In the present embodiment, the electric currents IU1, IV1, IU2, and IV2 from two channels, and the electric current IL, and the voltages VL and VH, a total of 11 data pieces are divided into two communication frames. Therefore, the number of the communication lines connecting the PCU 18 and the MGECU 22 is reduced, in comparison to a configuration in which the 11 data pieces are transmitted via respectively different communication lines. More specifically, 11 analog communication lines are reduced to five lines, i.e., to four pairs of multiplex communication lines 46a, 46b (46) and one trigger communication line 47.

Therefore, across the dividing wall between the compartment and the engine room through a small hole, the MGECU 22 on the compartment side and the PCU 18 on the engine room side are connected with the multiplex communication line 46 and the trigger communication line 47, i.e., with the fewer number of communication lines.

In such case, the multiplex communication line causes a communication delay, which is hardly caused in an analog communication line. Therefore, in a reference example which is provided with the multiplex communication line with no trigger communication line, although the number of communication lines is reduced, delay of communication poses a problem.

The detection signal of the rotation angle sensor is an analog input, and hardly produces delay. Therefore, as shown in FIG. 6, a calculation timing of the MGECU for the control of the inverters and the booster converter substantially matches the obtainment timing of the electric angles. On the other hand, since a communication delay is caused for the electric current and the voltage which are input into the MGECU via the multiplex communication line, the obtainment timing for obtaining/receiving the electric current and the voltage is set to an earlier timing that is earlier than the calculation timing by a preset time amount. That is, the obtainment timing of the electric angles and the obtainment timing of the electric current and the voltage do not match. If such a problem is left unattended, the values, i.e., the electric current values, the voltage values, and the electric angle values, from unmatching timings cause a deteriorated controllability of the inverters and the booster converter.

In the present embodiment, though, the MGECU 22 generates the trigger signal upon receiving the values detected by the rotation angle sensors 43 and 44, and outputs the signal to the communicator 45.

On the other hand, upon having an input of the trigger signal, the communicator 45 obtains plural values detected by at least one of the current sensors 38U, 38V, 39U, 39V, 40 and the voltage sensors 41, 42, and generates a communication frame.

Therefore, as shown in FIG. 7, the obtainment timing of the MGECU 22 for obtaining the electric angles θ1 and θ2 and the obtainment timing of the communicator 45 for obtaining the electric currents IU1, IV1, IU2, IV2, IL, and the voltages VL, VH substantially match with each other.

Thus, a time synchronization of the two obtainment timings is established, and a deterioration of the controllability of the inverters 31, 32 and the booster converter 33 is prevented.

More specifically, in the present embodiment, a trigger signal is generated by the MGECU 22 which is a subject of the controls, i.e., who controls the inverters 31 and 32 and the booster converter 33. Therefore, a trigger signal generation timing, i.e., the obtainment timing for obtaining the electric angles θ1 and θ2 is determinable with reference to the calculation timing for the above control.

Further, a two communication frames generation scheme in the present embodiment may be changed or modified to other schemes. That is, the number of communication frames is not necessarily limited to two. Depending on the number of data pieces received by the communicator 45 and the transmission cycle, the communicator 45 may generate only one communication frame, or may generate three or more frames. For example, the first communication frame may contain the electric currents IU1 and IV1 from two channels, and the second communication frame may contain the electric currents IU2 and IV2 from two channels, and the third communication frame may contain the electric current IL and the voltages VL, VH.

The number of multiplex communication lines 46 is not necessarily limited to two, either.

For example, one multiplex communication line 46 may be configured to serially transmit plural communication frames. According to the above, 11 analog communication lines is reduced to only three lines, i.e., to two multiplex communication lines 46 (i.e., CAN bus) and one trigger communication line 47, for example. That is, the number of communication lines is reduced further.

Second Embodiment

In the present embodiment, the common part with the preceding embodiment will not be repeated in the description, and only the difference therefrom is described for the MG controller 30.

Figure 8:
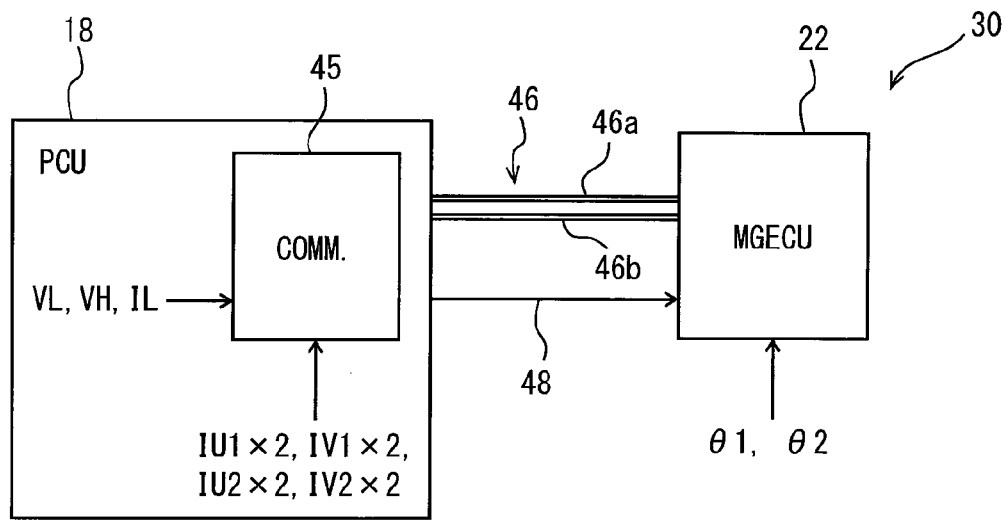
FIG. 8 is a block diagram of the MG controller of the present disclosure.

According to the present embodiment, as shown in FIG. 8, the MG controller 30 is provided with the MGECU 22, the PCU 18 which has the communicator 45, the multiplex communication line 46, and the trigger communication line 48. The trigger communication line 48 is an exclusive line for transmitting the trigger signal from the communicator 45 to the MGECU 22.

Next, the control method of the MG controller 30 for controlling the inverters 31, 32 and the booster converter 33 is described with reference to flowcharts in FIGS. 9 and 10.

Figure 9:
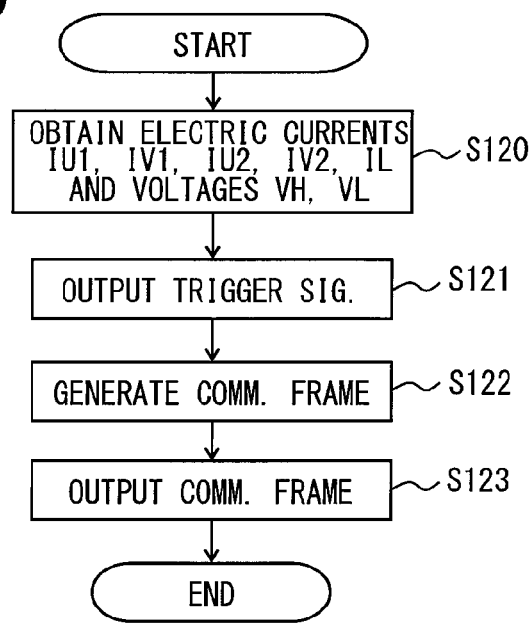
FIG. 9 is a flowchart of a process performed by the PCU of the present disclosure.

FIG. 9 illustrates a process in the PCU 18. The communicator 45 of the PCU 18 performs the following process, when a power supply is switched ON to the communicator 45. While the power supply is switched ON, the process is repeatedly performed.

The communicator 45 first obtains the electric currents UI1, IV1, IU2, IV2 from two channels, and the electric current IL, and the voltages VL, VH from the current sensors 38U, 38V, 39U, 39V, 40 and the voltage sensors 41, 42 (Step S120). For example, the detection values (i.e., detected current values and a detected voltage values) detected by the current sensors 38U, 38V, 39U, 39V, 40 and the voltage sensors 41, 42 are obtained at the same cycle (e.g., 100 μs) as the calculation cycle of the MGECU 22.

Further, upon obtaining the values detected by the current sensors 38U, 38V, 39U, 39V, 40 and the voltage sensors 41, 42, the communicator 45 generates the trigger signal and outputs the signal to the MGECU 22 (Step S121). At the same time, the trigger signal is transmitted to the MGECU 22 via the trigger communication line 48.

Further, the communicator 45 generates a communication frame based on the values obtained at S120 (Step S122). Then, the communicator 45 outputs the generated communication frame to the MGECU 22 via the multiplex communication line 46 (Step S123). In the present embodiment, the communicator 45 generates two communication frames and outputs each of those communication frames to the MGECU 22 via corresponding multiplex communication lines 46a and 46b, just like the first embodiment. After the completion of the output of each of the communication frames, a series of processes are finished.

Figure 10:
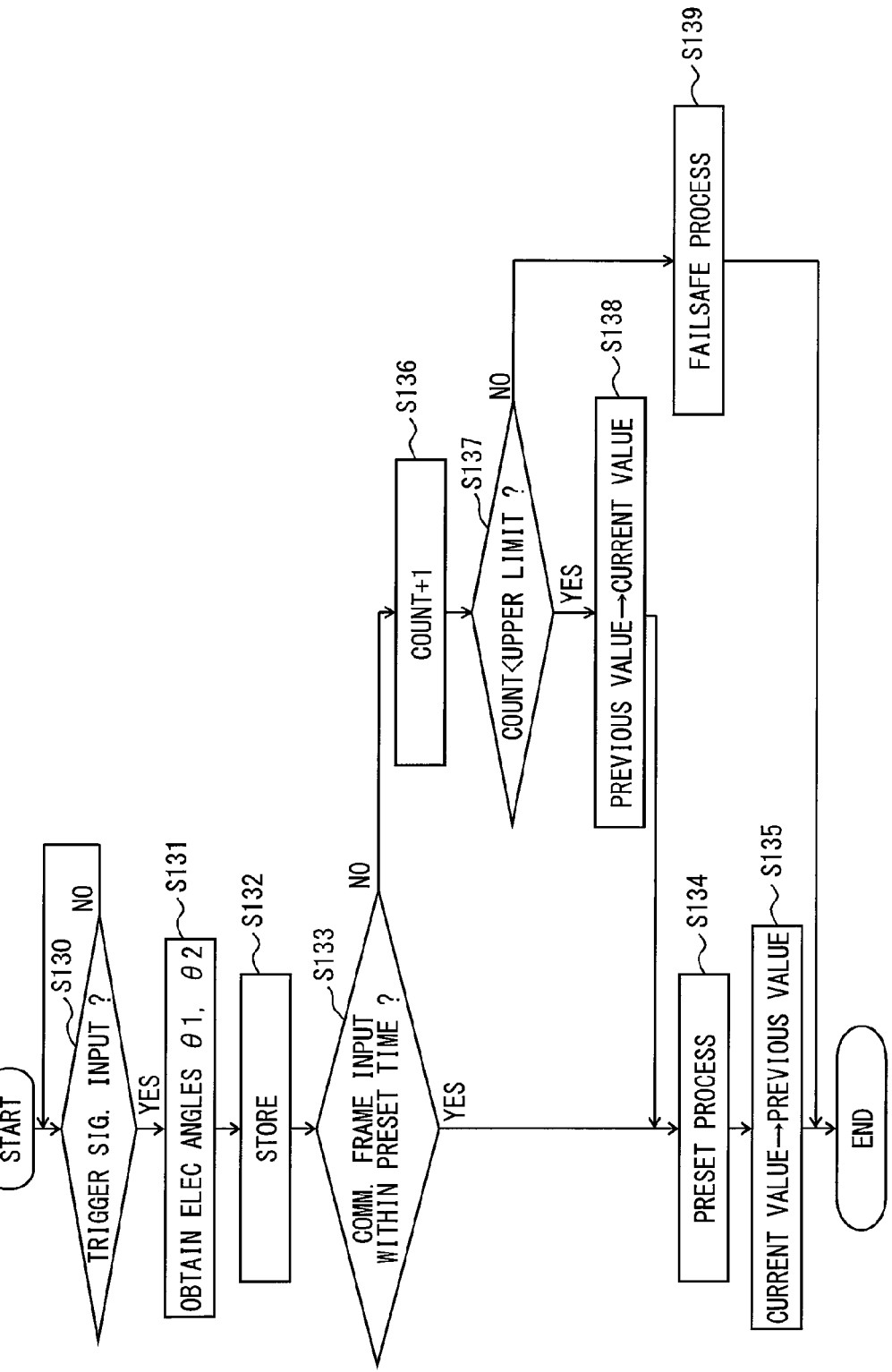
FIG. 10 is a flowchart of a process performed by the MGECU of the present disclosure.

FIG. 10 illustrates a process in the MGECU 22. The MGECU 22 performs the following process, when a power supply is switched ON. Further, while the power supply is switched ON, the process is repeatedly performed.

The microcomputer of the MGECU 22 firstly determines whether the trigger signal is inputted (Step S130). In Step S130, when it is determined that the trigger signal is input, the microcomputer of the MGECU 22 obtains the electric angles θ1 and θ2 detected by the rotation angle sensors 43 and 44 (Step S131). Then, the MGECU 22 stores the data obtained at S131 to the internal memory of the microcomputer, for example (Step S132).

Subsequently, it is determined whether the microcomputer of the MGECU 22 has an input of the communication frame within a preset time from the input of the trigger signal (Step S133). According to the present embodiment, it is determined whether two communication frames are inputted within the preset time (i.e., an interval) set up in advance (e.g., less than 80 μs).

In Step S133, when it is determined that a communication frame is input, the microcomputer of the MGECU 22 performs a preset process for controlling the inverters 31 and 32 and the booster converter 33 (Step S134). In such preset process, the electric angles θ1 and θ2 stored at S132 as well as the electric currents IU1, IV1, IU2, IV2 from two channels and the electric current IL and the voltages VL, VH are used for the calculation.

Subsequently, the microcomputer of the MGECU 22 stores current values in the memory, i.e., the electric currents IU1, IV1, IU2, IV2, IL, the voltages VL, VH and the electric angles θ1, and θ2 used for the preset process in S134 as previous values (Step S135). Then, a series of processes are finished.

In Step S133, on the other hand, when it is determined that the communication frame is not input, i.e., at least one of two communication frames is not received, the microcomputer of the MGECU 22 counts up the internal counter by 1 (Step S136), and determines whether the count reaches an upper limit of preset value (Step S137).

In Step S137, when it is determined that the count is less than an upper limit, the microcomputer of the MGECU 22 reads the previous value stored in the memory, and set it up as the current value (Step S138). Then, steps after S134 are performed.

In Step S137, when it is determined that the count is equal to or greater than the upper limit, the microcomputer of the MGECU 22 performs the failsafe process (Step S139). Then, a series of processes are finished.

Next, the operation effects of the MG controller 30 concerning the present embodiment are described.

In the present embodiment, the number of the communication lines connecting the PCU 18 and the MGECU 22 is reduced, just like the first embodiment.

Specifically, 11 analog communication lines is reduced to 5, i.e., to 4 pairs of two multiplex communication lines 46a, 46b (46) and one trigger communication line 47.

The communicator 45 of the PCU 18 generates the trigger signal upon obtaining the values detected by the current sensors 38U, 38V, 39U, 39V, 40 and the voltage sensors 41 and 42, and outputs the signal to the MGECU 22.

On the other hand, the MGECU 22 obtains the electric angles θ1 and θ2 detected by the rotation angle sensors 43 and 44, upon having an input of the trigger signal.

Therefore, the obtainment timing of the communicator 45 for obtaining the electric currents IU1, IV1, IU2, IV2, IL and the voltages VL, VH, and the obtainment timing of the MGECU 22 for obtaining the electric angles θ1 and θ2 substantially match. Thus, a time synchronization between two timings is established, and a deterioration of the controllability of the inverters 31 and 32 and the booster converter 33 is prevented.

Also in the present embodiment, the number of generated communication frames by the communicator 45 is not necessarily two, and the number of multiplex communication lines 46 is not necessarily limited to two, either.

Third Embodiment

In the present embodiment, the common part with the preceding embodiments will not be repeated in the description, and only the difference therefrom is described for the MG controller 30.

Figure 11:
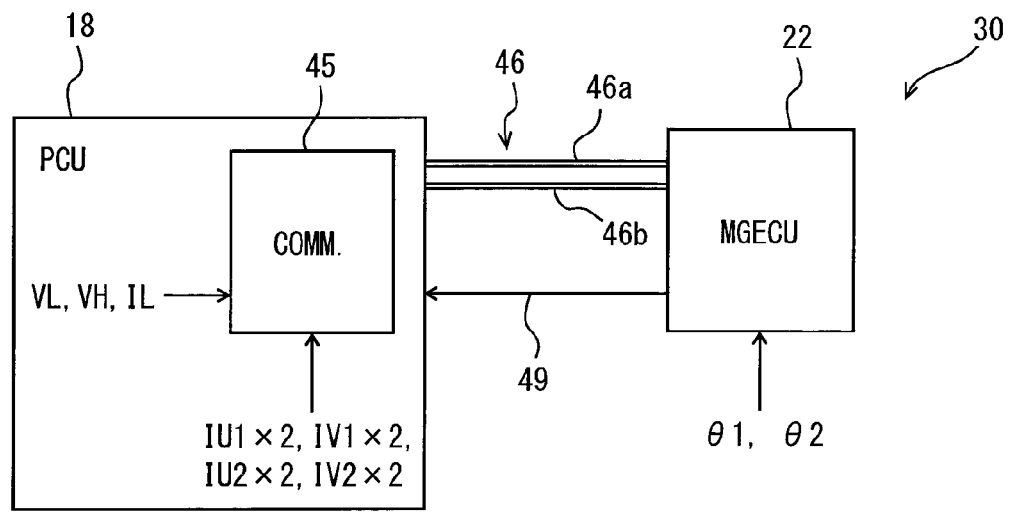
FIG. 11 is a block diagram of the MG controller of the present disclosure.

According to the present embodiment, as shown in FIG. 11, the MG controller 30 is provided with the MGECU 22, the PCU 18 which has the communicator 45, the multiplex communication line 46, and a shutdown communication line 49. The shutdown communication line 49 is a communication line used for transmission of a shutdown signal output from the MGECU 22 to the PCU 18, in order to stop the drive of the inverters 31, 32 which constitute the voltage converter, or to stop the drive of the booster converter 33. The other configuration is the same as the first embodiment. The shutdown communication line 49 is equivalent to a trigger communication line in the claims.

Figure 12:
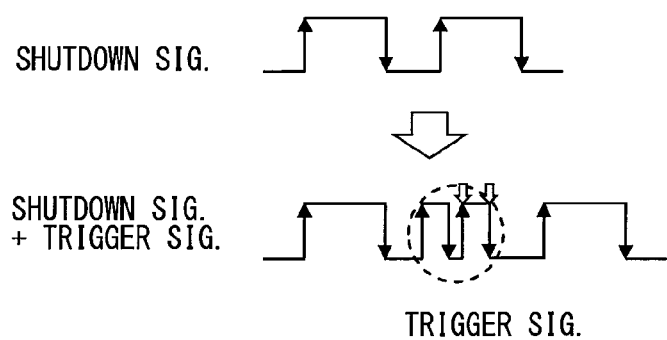
FIG. 12 is an illustration of a trigger signal.

According to the present embodiment, a shutdown signal is multiplexed with the trigger signal. As shown in FIG. 12, the microcomputer of the MGECU 22 performs a frequency modulation of the shutdown signal, and multiplexes the trigger signal with the shutdown signal. In FIG. 12, an ON time of a PWM signal is changed and the ON time of the trigger signal is made shorter than the shutdown signal. Therefore, the trigger signal is recognized by (the shortness of) the ON time of the first pulse, and a rise and a fall between HI-LO levels in the second pulse are used as trigger timings.

According to the above, the trigger signal is transmitted to the communicator 45 from the MGECU 22 via the existing shutdown communication line 49. Therefore, the number of communication lines connecting the PCU 18 and the MGECU 22 is reduced from the configurations in the first and second embodiments, in which dedicated trigger communication lines 47 and 48 are used for the transmission of the trigger signal.

The existing communication line is not necessarily limited to the above-mentioned shutdown communication line 49.

For example, a communication line for transmitting the failsafe signal which notifies abnormality of the inverters 31 and 32 which constitute the voltage converter or of the booster converter 33 from the PCU 18 to the MGECU 22 can also be used. In such case, the failsafe signal is multiplexed with the trigger signal.

Although the present disclosure has been fully described in connection with preferred embodiment thereof with reference to the accompanying drawings, it is to be noted that various changes and modifications will become apparent to those skilled in the art.

For example, the application of the MG controller 30 is not necessarily limited to the split-type hybrid vehicle 10. Therefore, the number of the MGs is also not limited to two, which has been described above as two MGs 12 and 13, i.e., two rotating electric machines. Further, the present disclosure is applicable to an electric vehicle, which does not have an internal-combustion engine.

The PCU 18 in the above is shown as having two inverters 31 and 32 and the booster converters 33 as a power convertor. However, the power convertor needs to have an inverter at least, and the number of the inverters is not necessarily limited to two.

For example, there may be only one pair of the MG and the inverter, or three or more pairs of the MG and the inverter.

A part of the functions of the MGECU 22 may be provided by the PCU 18.

For example, a PWM modulator, which is not illustrated, for generating the control signals S11-S16, S21-S26 may be provided by the PCU 18, instead of providing it from the MGECU 22. In such a case, the PWM modulator is disposed on a controller board together with the communicator 45 and other components.

Although the HVECU 20, the engine ECU 21, the MGECU 22, and the battery ECU 23 are described as separate components in the above, those ECUs 20-23 may be united as one ECU.

For example, the HVECU 20 and the MGECU 22 may be united as one ECU. Also, the HVECU 20, the MGECU 22, and the battery ECU 23 may be united as one ECU. Further, all the ECUs 20-23 may be united as one ECU.

Such changes, modifications, and summarized schemes are to be understood as being within the scope of the present disclosure as defined by the claims.

What is claimed is:

1. A rotating electric machine control system disposed in a vehicle and controlling rotating electric machines, at least one rotating electric machine used to power a travel of a vehicle, the rotating electric machine control system comprising:
    a power control unit including
        a voltage converter converting a direct current voltage from a direct current power source and outputting a converted three-phase alternating current to the at least one rotating electric machine,
        a current detector detecting an electric current, as a detected current value, that is output from the voltage converter to the at least one rotating electric machine in each of three phases,
        a voltage detector detecting the direct current voltage, as a detected voltage value, and
        a communicator receiving plural values detected by at least one of the current detector or the voltage detector, generating a communication frame that includes the plural values, and outputting the communication frame that includes the plural values;
    a control section controlling the voltage converter to output the converted three-phase alternating current to the at least one rotating electric machine which outputs a requested torque from the at least one rotating electric machine, the control section being provided separately apart from the power control unit;
    a multiplex communication line communicably connecting the power control unit and the control section for a transmission of the communication frame from the communicator to the control section;
    a rotation detector detecting a rotation position of the at least one rotating electric machine and outputting the rotation position to the control section via a line other than the multiplex communication line; and
    a trigger communication line communicably connecting the power control unit and the control section to transmit a trigger signal from the control section to the communicator, wherein
    the control section outputs the trigger signal via the trigger communication line to the communicator upon receiving the rotation position from the rotation detector,
    the communicator, upon receiving an input of the trigger signal, generates the communication frame by receiving at least one of a plurality of detected current values or a plurality of detected voltage values from at least one of the current detector or the voltage detector, and outputs the communication frame to the control section via the multiplex communication line, and
    the control section performs a preset process for a control of the voltage converter based on (i) the rotation position from the rotation detector and (ii) the communication frame at a corresponding timing that corresponds to the rotation position from the rotation detector.

2. The rotating electric machine control system of claim 1, wherein
    the trigger communication line is used only to transmit the trigger signal.

3. The rotating electric machine control system of claim 1, wherein
    the trigger communication line transmits a shutdown signal that is output from the control section to the voltage converter which stops a drive of the voltage converter, and
    the trigger signal is superposed onto the shutdown signal.

4. A rotating electric machine control system for controlling rotating electric machines, at least one rotating electric machine used to power a travel of a vehicle, the rotating electric machine control system comprising:
    a power control unit including
        a voltage converter converting a direct current voltage from a direct current power source and outputting a converted three-phase alternating current to the at least one rotating electric machine,
        a current detector detecting an electric current, as a detected current value, that is output from the voltage converter to the at least one rotating electric machine in each of three phases,
        a voltage detector detecting the direct current voltage, as a detected voltage value, and
        a communicator receiving plural values detected by at least one of the current detector or the voltage detector, generating a communication frame that includes the plural values, and outputting the communication frame that includes the plural values;
    a control section controlling the voltage converter to output the converted three-phase alternating current to the at least one rotating electric machine which outputs a requested torque from the at least one rotating electric machine, the control section being provided separately apart from the power control unit;

a multiplex communication line communicably connecting the power control unit and the control section for a transmission of the communication frame from the communicator to the control section;

a rotation detector detecting a rotation position of the at least one rotating electric machine and outputting the rotation position to the control section via a line other than the multiplex communication line; and a trigger communication line communicably connecting the power control unit and the control section to transmit a trigger signal from the control section to the communicator, wherein the communicator, upon receiving at least one of a plurality of detected current values or a plurality of detected voltage values from at least one of the current detector or the voltage detector, outputs the trigger signal to the control section via the trigger communication line, generates the communication frame, and outputs the communication frame to the control section via the multiplex communication line, and the control section, upon receiving an input of the trigger signal, receives the rotation position from the rotation detector and performs a preset process for a control of the voltage converter based on the rotation position and the communication at a corresponding timing that corresponds to the rotation position.

* * * * *